United States Patent Office 3,268,505
Patented August 23, 1966

3,268,505
METAL-CONTAINING AZO DYESTUFFS
Karl-Heinz Schündehütte, Fritz Suckfüll, and Horst Nickel, Leverkusen, Germany, assignors to Farbenfabriken Bayer Aktiengesellschaft, Leverkusen, Germany, a German corporation
No Drawing. Filed Nov. 23, 1962, Ser. No. 239,761
Claims priority, application Germany, Dec. 14, 1961, F 35,550; Apr. 21, 1962, F 33,619
6 Claims. (Cl. 260—146)

The invention concerns metal-containing azo dyestuffs; more particularly it concerns meal-containing azo dyestuffs which in the free acid state correspond to the formula

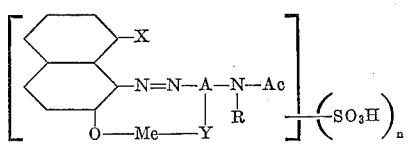

In this formula A stands for a carbocyclic aromatic ring of the benzene or naphthalene series in which Y occupies the o-position to the azo bridge, Y denotes a —O— or —OOC— group, R is hydrogen or a lower alkyl group, Me is —Cu— or —Ni—, X is —OH, —NHOCCH₃, —NHSO₂CH₃ or —NHSO₂C₆H₅, Ac is an acyl group; the naphthalene moiety as well as the residue A may contain further substituents; and $n$ is an integer from 2 to 10.

It is an object of this invention to provide novel metal-containing mono- and polyazo dyestuffs. Another object is the provision of novel metal-containing mono- and polyazo dyestuffs which contain fibre-reactive groupings, especially those which are able to undergo covalent linkage with the —OH groups of natural and regenerated cellulose textile materials. It is also an object of this invention to provide textile materials, particularly those of cotton and regenerated cellulose, which are dyed or printed very fast to wet processing with the novel metal-containing fibre-reactive dyestuffs of the present invention. Still another object is the provision of non-fibre-reactive direct dyestuffs for cotton and regenerated cellulose.

The novel metal-containing azo dyestuffs are obtained, inter alia, when aminoazo compounds of the general Formula I

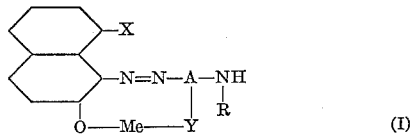

wherein X, Y, Me, A and R have the above significance, are converted into the corresponding acylaminoazo compounds with the aid of acylating agents, Some of the aminoazo compounds of Formula I can be obtained when a diazotised peri-aminonaphthol, expediently in the form of its O-acyl compound indicated above, e.g. of the O-phenylsulfonic acid ester, is coupled with an aminophenol or an aminonaphthol component, the latter in an alkaline medium, and the intermediate compound obtained in the case of the use of an O-acylated peri-aminonaphthol, for instance a compound of the Formula II

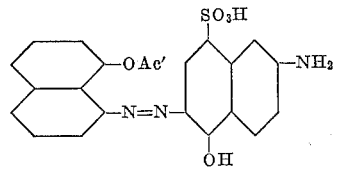

wherein Ac' represents an acyl radical, is oxidatively coppered. The introduction of the hydroxyl group may also be carried out by splitting up an alkoxy group or by the exchange of halogen in the o-position to the azo group in the left-hand naphthalene moiety.

A further process consists in that an acylamino or nitro group-substituted diazonium compound of the benzene or naphthalene series is coupled with a 2,8-dihydroxy-naphthalene or a 2-hydroxy-8-acylamino-naphthalene or a 2-hydroxy-8-acyloxy-naphthalene compound, and the resulting intermediate compound, for instance a compound of Formula III

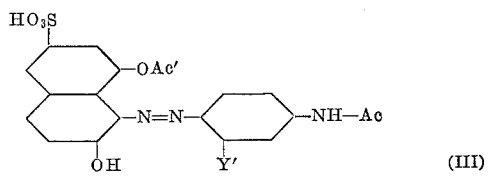

wherein Y' is H, —OH, —COOH or —Cl and Ac and Ac' represent acyl residues, is converted into the copper complex by means of coppering, if necessary under oxidising conditions.

The acylamino group —NH—Ac in III may be converted into the free amino group by hydrolysis, if this is desired, which, in turn, is then reacted with an arbitrary acylating agent. An —O— acyl group optionally being present in 8-position of the left-hand naphthalene component may be saponified before or subsequent to the coppering. The same dyestuffs can be obtained by the use of nitro group-substituted diazonium compounds on reduction of the nitro group to the amino group and subsequent acylation.

The dyestuffs of Formulae II and III may contain further substituents, particularly sulfonic acid groups, in the molecule.

All those processes may be regarded as equivalent, during which one of the three possible hydroxyl groups of Formula I is introduced by conversion of an amino group situated at the same position into —OH according to known methods.

A modification of the process for the production of the new dyestuffs consists in that the acylation of the amino group is not carried out as the last process step, but rather at an earlier phase of the dyestuff production, such as, e.g., in the case of the process with dyestuff III.

Mono- and poly-functional acylating agents are suitable for the conversion of the aminoazo compounds of Formula I. With polyfunctional acylating agents, such as phosgene, cyanuric chloride, terephthalic acid chloride, fumaric acid chloride and the like, symmetrical dyestuffs can thereby be obtained or also asymmetrical dyestuffs by use of a second amino component of different constitution either belonging to the group of dyestuffs I or belonging to another class of amino group-containing dyestuffs. The dyestuffs thus obtainable are particularly suitable as direct dyestuffs for cotton. If in the case of reaction with polyfunctional acylating agents in the presence of a second amino component, the latter or the final dyestuff contain further reactive groupings or substituents, there are obtained reaction products which belong to the class of dyestuffs known as reactive dyestuffs, i.e. dyestuffs in which there are substituents capable or reacting with the OH or NH groups of the fibre, e.g. with hydroxyl groups of natural or regenerated cellulose, with the formation of a covalent bond. Reactive groupings may of course also be subsequently introduced at suitable end groupings, particularly amino groups, of the dyestuff molecule.

In general, reactive dyestuffs are then obtained within the scope of the present invention if for acylation of the —NH—R group in the benzene or naphthalene nucleus A of the dyestuff I, there are used acylating agents which have several reactive groups or substituents in the molecule, and when the reaction is conducted so that the final dyestuffs exhibit at least one reactive substituent or at least one reactive grouping. For this purpose are suitable, e.g., cyanuric chloride, halogeno pyrimidines, such as tri- or tetrachloropyrimidines, halopyrimidine-sulphonic acid halides or -carboxylic acid halides, halo-fatty acid chlorides, derivatives of unsaturated aliphatic carboxylic acids, such as acrylic acid chloride and corresponding halogen substitution products, 2,3-halogenoquinoxaline-6-carboxylic acid halides or -sulphonic acid halides, such as 2,3-dichloroquinoxaline-6-carboxylic acid chloride, halophthalazine acid halides, halobenzthiazole acid halides, and the like.

The last mentioned group of dyestuffs is suitable for the dyeing and printing of materials containing hydroxyl or amide groups, such as textile fibres, threads, and fabrics of wool, silk, synthetic polyamide and polyurethane fibres, particularly for the washfast dyeing and printing of native or regenerated cellulose, whereby the dyestuffs are expediently fixed by treatment with acid-binding agents and optionally the action of heat according to the processes which have become known for reactive dyestuffs.

The following examples are given for the purpose of illustrating the invention without, however, limiting it thereto.

Example 1

0.1 mol of the copper complex compound of the dyestuff of formula

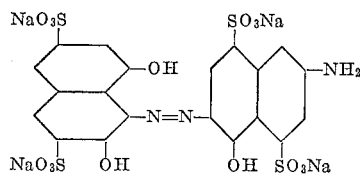

(prepared according to the statements in German Patent 1,117,235 by coupling diazotized 1-amino-8-(benzene-sulphonyl-oxy)-naphthalene-disulphonic acid-(3,6) in a soda-alkaline medium with the equivalent amount of 2-acetylamin0-5-hydroxynaphthalene-disulphonic acid-(4,8), conversion of the monoazo compound into the copper complex by the methods of oxidative coppering, and hydrolysis of the acetyl and the benzene-sulphonyl group) is dissolved in 2,500 parts by volume of water at 35° C. at pH 6–6.5, and treated at this temperature with a suspension of 0.1 mol of 2,3-dichloroquinoxaline-carboxylic acid chloride in ice-water and a little dispersing agent. A pH of 6–6.5 is maintained during the condensation by the addition of a sodium carbonate solution. After the reaction is completed, the dyestuff is separated by the addition of 125 parts by weight of potassium chloride and isolated. When dried, the dyestuff is a dark powder which dissolves in water with a blue colour.

100 parts by weight of a cotton fabric are foularded at room temperature with an aqueous solution, containing 2% of the dyestuff, 15 g./l. of sodium hydrogen carbonate and 150 g./l. of urea, intermediately dried, heated at 140° C. for 10 minutes, thereafter rinsed and soaped with boiling. The fabric is dyed in very bright blue shades.

If the copper complex compound of this example is replaced by the nickel complex of the dyestuff of the formula

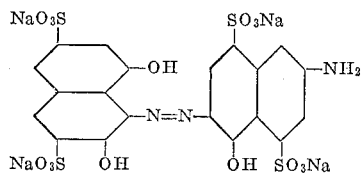

and otherwise proceedsd as described above a dyestuff is obtained which dissolves in water with blue colour and dyes cotton blue shades.

Example 2

0.1 mol of the copper complex compound of the dyestuff of formula

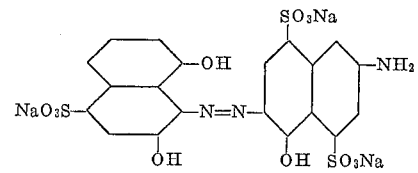

(prepared by coupling diazotised 1-amino-2-bromo-8-(benzene-sulphonyl-oxy)naphthalene-sulphonic acid-(4) with the equivalent amount of 2-acetylamino-5-hydroxynaphthalene-disulphonic acid-(4,8), conversion of the monoazo compound into the copper complex by the methods of dehalogenating coppering, and hydrolysis of the acetyl and benzene-sulphonyl group) is dissolved in 3,000 parts by volume of water at pH 6, and combined, whilst stirring, at a temperature of about 5° C., with a suspensioin of 18.5 parts by weight (0.1 mol) of cyanuric chloride in ice-water/acetone. The mixture is stirred until the condensation is completed, and the dyestuff separated by the addition of a little sodium chloride and isolated. The residue is washed with acetone and dried at room temperature under reduced pressure. A dark powder is obtained, which dissolves in water with a blue colour.

100 parts by weight of a cotton fabric are previously dyed for 10 minutes with a 2% aqueous solution of the dyestuff obtained. 50 g./l. of sodium chloride are added in portions within 20 minutes, and 5 g./l. of calcined sodium carbonate (previously dissolved) are subsequently added. The material is dyed in the cold for one hour, rinsed, and thoroughly soaped with boiling. By this method the fabric is dyed in bright greenish blue shades. The dyeing exhibits good wet and light fastnesses.

Example 3

0.1 mol of the copper complex compound of the dyestuff of formula

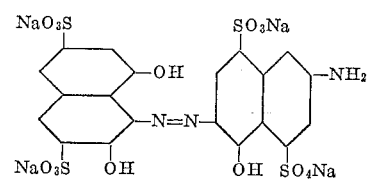

(prepared according to the statements in Example 1) is dissolved in 2000 parts by volume of water, and combined at pH 6 with a suspension of the cyanuric chloride mono-condensation product of the formula

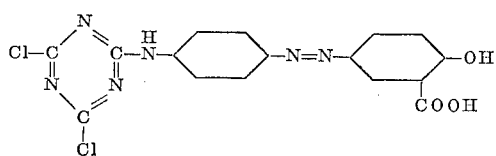

obtained by conventional methods. The mixture is stirred at 40–50° until the condensation is completed. The resulting dyestuff is salted out with sodium chloride and isolated. When dried, it is a dark powder which dyes cotton in green shades. An improvement of the wet fastness is attained by subjecting the dyeing to an alkaline after-treatment.

Example 4

0.1 mol of the monoazo dyestuff of formula

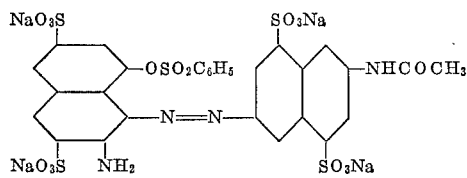

is dissolved in 1,500 parts by volume of water, treated with 30 parts by volume of concentrated hydrochloric acid and, at 20° C., with a solution of 7 parts by weight of sodium nitrite. The o-hydroxy-azo compound is formed with foaming. The conversion into the copper complex and the hydrolysis of the benzene-sulphonyl and acetyl group are carried out according to the statements of Example 1. The resulting dyestuff paste is dissolved in 2500 parts by volume of soda-alkaline water and converted into the urea by passing in phosgene at about 40° C. When the phosgenation is completed, the dyestuff is separated by the addition of 150 parts by weight of potassium chloride and isolated. When dried, the copper complex compound of the dyestuff of formula

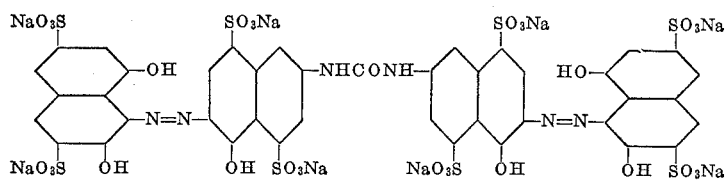

is a dark powder which dissolves in water with a blue colour and dyes cotton in very bright blue shades fast to light.

The same dyestuff can be obtained by coupling the diazotised 1 - amino-8-(benzene-sulphonyl-oxy)-naphthalene-disulphonic acid-(3,6) in a soda-alkaline medium with the urea compound of formula

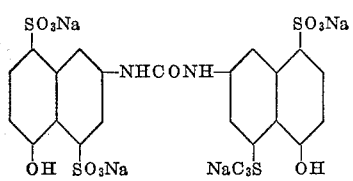

subsequent conversion of the disazo dyestuff into the copper complex, and alkaline hydrolysis of the benzene sulphonyl group.

Example 5

0.1 mol of the copper complex compound of the dyestuff of the formula

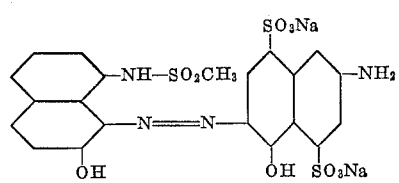

(prepared by coupling diazotised 2-amino-6-acetylamino-naphthalene-disulphonic acid-(4,8) with 1-methylsulphonylamino-7-hydroxynaphthalene, conversion into the copper complex and hydrolysis of the acetyl group) is dissolved in 2500 parts by volume of soda-alkaline water. Phosgene is passed into the solution at 40–50° C. until the formation of the urea is completed. The precipitated dyestuff is isolated and dried. It dissolves in water with a blue colour and dyes cotton in blue shades.

Example 6

0.1 mol of the copper complex compound of the dyestuff of the formula

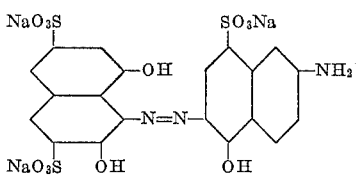

(prepared by coupling 5-hydroxy-6-diazo-2-nitronaphthalene-8-sulphonic acid with 2,8-dihydroxynaphthalene-3,6-disulphonic acid, reduction of the nitro group and conversion into the copper complex) is dissolved in 2000 parts by volume of water at 5° C. at pH 5–6, treated with a solution of 0.05 mol of terephthalic acid dichloride in acetone, and stirred until the condensation is completed. When dried, the dyestuff is a dark powder, which dissolves in water with a blue colour and dyes cotton in blue shades.

Example 7

0.1 mol of the copper complex compound of the dyestuff of the formula

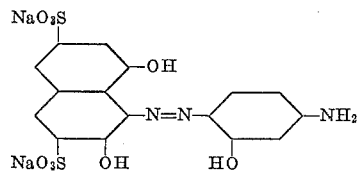

(prepared by coupling the diazonium salt from 1-amino-2-methoxy-4-nitrobenzene with the 2-hydroxy-8-(benzenesulfonyl-oxy)-naphthalene-disulfonic acid-(3,6), conversion of the monoazo compound into the copper complex by the methods of dealkylating coppering and reduction of the nitro group to the amino group) is dissolved in 2000 parts by volume of water at pH 5 and, while stirring at a temperature of 0 to 5° C., combined with a suspension of 18.5 parts by weight (0.1 mol) of cyanuric chloride in ice-water/acetone. The mixture is stirred until the condensation is completed. The resulting dyestuff is separated by the addition of a little sodium chloride and isolated. The residue is washed with acetone and dried at room temperature under reduced pressure. One obtains a dark powder which dissolves in water with blue colour and which dyes cotton reddish blue shades when following the method given in Example 2.

A dyestuff of similar shade and properties is obtained by coupling diazotised 1-amino-8-(benzenesulfonyl-oxy)-naphthalene-disulfonic acid-(3,6) in weakly acid medium with the equivalent amount of 1-amino-3-hydroxybenzene-6-sulfonic acid, conversion of the monoazo compound into the copper complex by the methods of the oxidative coppering, hydrolysis of the benzene sulfonyl group and condensation of the copper complex compound of the formula

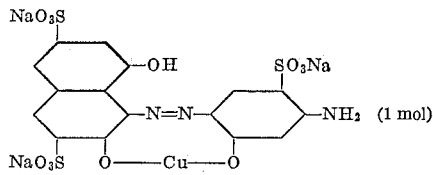

with (1 mol) cyanuric chloride.

*Example 8*

0.1 mol of the copper complex compound of the dyestuff of formula

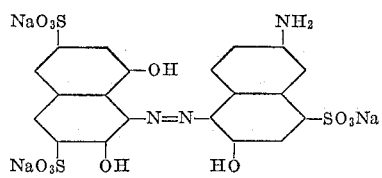

(prepared by coupling of diazotised 1-amino-8-(benzenesulfonyl-oxy)-naphthalene-disulfonic acid-(3,6) in soda-alkaline medium with the equivalent amount of 2-acetyl-amino-6-hydroxynaphthalene-8-sulfonic acid, conversion of the monoazo compound into the copper complex by the methods of the oxidative coppering and hydrolysis of the acetyl and the benzene sulfonyl group) is dissolved in 2000 parts by volume of water of 35° C. at pH 6 to 6.5 and treated at this temperature with a suspension of 0.1 mole of 2,3-dichloroquinoxaline-6-carboxylic acid chloride in ice-water and a little dispersing agent. During the condensation a pH of 6 to 6.5 is maintained by the addition of a sodium carbonate solution. After the reaction is complete the dyestuff is separated by the addition of 400 parts by weight of sodium chloride and isolated. When dried, the dyestuff is a dark powder which dissolves in water with a blue colour.

A dyestuff of similar shade is obtained if the copper containing aminoazo dyestuff of this example is condensed with 0.1 mol of cyanuric chloride instead of with 0.1 mol of 2,3-dichloroquinoxaline-6-carboxylic acid chloride, or if the copper containing aminoazo dyestuff of this example is condensed with 0.1 mol of 1,3-dichloro-5-(3'-sulfophenyl)-aminotriazine-2,4,6.

*Example 9*

0.1 mol of the copper complex compound of the dyestuff of formula

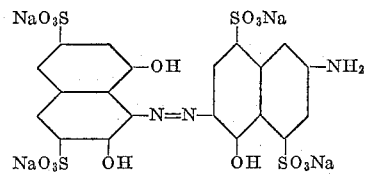

(prepared by the method given in Example 1) is dissolved in 2000 parts by volume of water of 60° C. at pH 6–7 and at this temperature added to a suspension of 0.1 mol of 2,4,5,6-trichloropyrimidine in ice-water and little dispersing agent. During the condensation reaction a pH of 6–7 is maintained by the addition of sodium carbonate solution. After the reaction is complete the dyestuff is separated by the addition of 150 parts by weight of potassium chloride and 150 parts by weight of sodium chloride and isolated. When dried, the dyestuff is a dark powder which dissolves in water with blue colour and which dyes cotton blue shades.

*Example 10*

0.1 mol of the copper complex compound of the dyestuff of formula

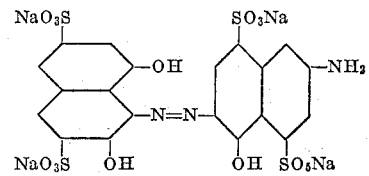

(prepared by the method given in Example 1) is dissolved in 2000 parts by volume of water at pH 6 and added to a solution of the monocondensation product of cyanuric chloride, obtained by known methods, of the formula

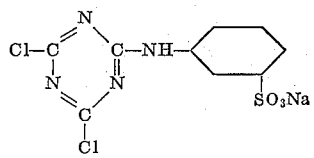

The mixture is stirred at 40–50° C. until the condensation is complete. During the condensation reaction a pH of 5–6 is maintained by the addition of sodium carbonate solution. The dyestuff obtained is salted out with sodium chloride and isolated. When dried, it is a dark powder which dyes cotton blue shades.

*Example 11*

0.1 mol of the copper complex compound of the dyestuff of formula

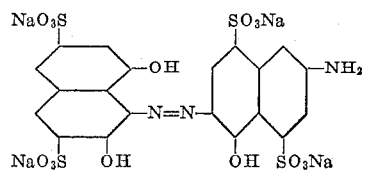

(prepared by the method given in Example 1) is dissolved in 1500 parts by volume of water and combined, while stirring at a temperature of 0–5° C. with a suspension of 18.5 parts by weight (0.1 mol) cyanuric chloride in ice-water/acetone. The mixture is stirred until the condensation is complete. The dyestuff obtained is separated by the addition of 300 parts by weight of sodium chloride and isolated. When dried, it is a dark powder which dissolves in water with blue colour and dyes cotton blue shades.

*Example 12*

0.1 mol of the copper complex compound of the dyestuff of formula

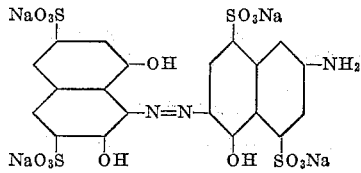

(prepared by the method given in Example 1) is condensed with 0.1 mol cyanuric chloride as described in Example 11. To the solution of the monocondensation product there is added a solution of 0.1 mol of 4-aminoazo-benzene-4'-sulfonic acid. The reaction mixture is heated to 40–50° C. and at pH 5–6 stirred until the condensation reaction is complete. Thereafter 0.1 mol of N-methylaniline is added and reacted with the monochloro triazinyl derivative in usual manner. After isolating and drying a dyestuff is obtained which represents a dark powder. It dissolves in water with green colour and dyes cotton green shades.

We claim:
1. An azo dyestuff which in the free acid state corresponds to the formula

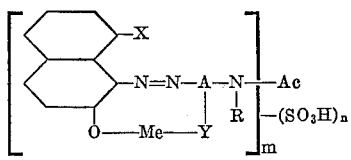

wherein A is a member selected from the group consisting of a phenylene and a naphthalene residue bearing Y in o-position to the azo bridge; Y is a complexing member selected from the group consisting of —O— and —OOC—; R is a member selected from the group consisting of hydrogen and lower alkyl; Me is a metal selected from the group consisting of copper and nickel; X is a member selected from the group consisting of —OH, —NHOCCH$_3$, —NHSO$_2$CH$_3$ and —NHSO$_2$C$_6$H$_5$; $n$ is an integer of 2–10; and $m$ is an integer of 1–2, $m$ being defined as 1 when Ac is a member selected from the group consisting of trichloropyrimidyl, dichloropyrimidyl, chloropyrimidyl-sulfonyl, chloropyrimidyl-carbonyl, dichlorotriazinyl, monochloro monophenylamino-triazinyl, monochloro-mono-(sulfophenyl-amino)-triazinyl, monochloro-mono-(hydroxy-carboxy-substituted phenyl-azo-phenylamino)-triazinyl, acrylyl, and chloro-substituted acrylyl; and $m$ as 2 when Ac is

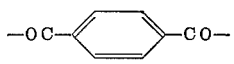

2. An azo dyestuff which in the free acid state corresponds to the formula

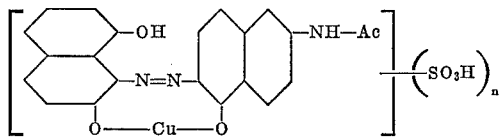

wherein Ac is a member selected from the group consisting of trichloropyrimidyl, dichloropyrimidyl, chloropyrimidyl-sulfonyl, chloropyrimidyl-carbonyl, dichlorotriazinyl, monochloro monophenylamino-triazinyl, monochloro-mono(sulfophenyl-amino)-triazinyl, monochloro-mono-(hydroxycarboxy-substituted phenyl-azo-phenylamino)-triazinyl, acrylyl, and chloro-substituted acrylyl; and $n$ is an integer of 2–10.

3. The copper complex azo dyestuff which in the free acid state corresponds to the formula

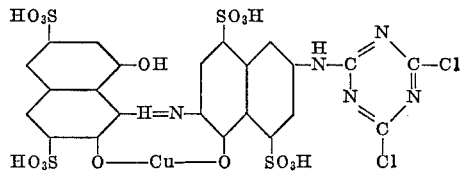

4. The copper complex azo dyestuff which in the free acid state corresponds to the formula

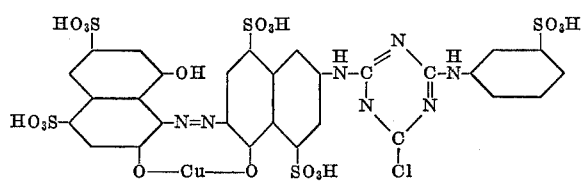

5. The copper complex azo dyestuff which in the free acid state corresponds to the formula

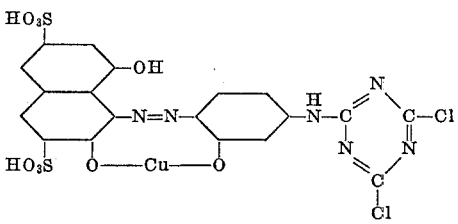

6. The copper complex azo dyestuff which in the free acid state corresponds to the formula

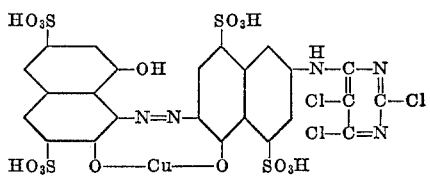

References Cited by the Examiner
UNITED STATES PATENTS

| | | | |
|---|---|---|---|
| 1,921,337 | 8/1933 | Wiedemann et al. | 260—148 |
| 2,620,332 | 12/1952 | Widmer et al. | 260—151 XR |
| 2,720,519 | 10/1955 | Reich | 260—151 XR |
| 2,919,269 | 12/1959 | Nickel et al. | 260—151 XR |

FOREIGN PATENTS

| | | |
|---|---|---|
| 1,221,621 | 1/1960 | France. |
| 421,421 | 12/1934 | Great Britain. |
| 786,918 | 11/1957 | Great Britain. |

CHARLES B. PARKER, *Primary Examiner.*

IRVING MARCUS, *Examiner.*

REYNOLD J. FINNEGAN, DONALD M. PAPUGA,
*Assistant Examiners.*